United States Patent
Boyless et al.

(10) Patent No.: US 11,418,716 B2
(45) Date of Patent: Aug. 16, 2022

(54) SPHERICAL IMAGE BASED REGISTRATION AND SELF-LOCALIZATION FOR ONSITE AND OFFSITE VIEWING

(71) Applicants: Nathaniel Boyless, Denver, CO (US); Jiayi Liu, Lakewood, CO (US); Sriram Siva, Golden, CO (US); Hao Zhang, Golden, CO (US)

(72) Inventors: Nathaniel Boyless, Denver, CO (US); Jiayi Liu, Lakewood, CO (US); Sriram Siva, Golden, CO (US); Hao Zhang, Golden, CO (US)

( * ) Notice: Subject to any disclaimer, the term of this patent is extended or adjusted under 35 U.S.C. 154(b) by 185 days.

(21) Appl. No.: 16/889,578

(22) Filed: Jun. 1, 2020

(65) Prior Publication Data
US 2020/0389601 A1 Dec. 10, 2020

Related U.S. Application Data

(60) Provisional application No. 62/857,146, filed on Jun. 4, 2019.

(51) Int. Cl.
*H04N 5/232* (2006.01)
*G06F 17/16* (2006.01)
*G06T 19/00* (2011.01)

(52) U.S. Cl.
CPC ....... *H04N 5/232945* (2018.08); *G06F 17/16* (2013.01); *G06T 19/006* (2013.01); *H04N 5/23238* (2013.01)

(58) Field of Classification Search
CPC ......... H04N 5/232945; H04N 5/23238; H04N 5/232; G06F 17/16; G06T 19/006; G06T 7/246; G06T 7/33; G06T 2207/10016; G06T 2207/10024; G06T 2207/20016; G06T 2207/30208; G06T 2207/30244; G06T 7/74

See application file for complete search history.

(56) References Cited

U.S. PATENT DOCUMENTS

| | | | |
|---|---|---|---|
| 5,691,527 A | 11/1997 | Hara |
| 5,726,435 A | 3/1998 | Hara |
| 6,094,625 A | 7/2000 | Ralston |
| 7,032,823 B2 | 4/2006 | Nojiri |
| 7,301,547 B2 | 11/2007 | Martins |
| 8,180,396 B2 | 5/2012 | Athsani |
| 8,773,465 B2 | 7/2014 | France |
| 9,196,094 B2 | 11/2015 | Ur |
| 9,571,644 B2 | 4/2017 | Steiner |
| 9,652,896 B1 | 5/2017 | Jurgenson |

(Continued)

*Primary Examiner* — Yogesh K Aggarwal
(74) *Attorney, Agent, or Firm* — Critical Path IP Law, LLC

(57) ABSTRACT

Systems and methods for image registration and self-localization for onsite and offsite viewing are provided. In one aspect, systems and methods for spherical image based registration and self-localization for onsite and offsite viewing, such as augmented reality viewing and virtual reality viewing, are provided. In one embodiment, a system includes a portable electric device fitted with a device camera, an external omnidirectional spherical camera, and a remote server. In one embodiment, a method of use employs a set of fiducial markers inserted in images collected by a spherical camera to perform image registration of spherical camera images and device camera images.

20 Claims, 11 Drawing Sheets

(56) References Cited

U.S. PATENT DOCUMENTS

| | | |
|---|---|---|
| 2006/0152589 A1 | 7/2006 | Morrison |
| 2012/0300020 A1 | 11/2012 | Arth |
| 2015/0170256 A1 | 6/2015 | Pettyjohn |
| 2015/0193982 A1 | 7/2015 | Mihelich |
| 2016/0337773 A1 | 11/2016 | Tsilfidis |
| 2017/0243403 A1 | 8/2017 | Daniels |
| 2019/0082118 A1* | 3/2019 | Wang .................... H04N 5/265 |

* cited by examiner

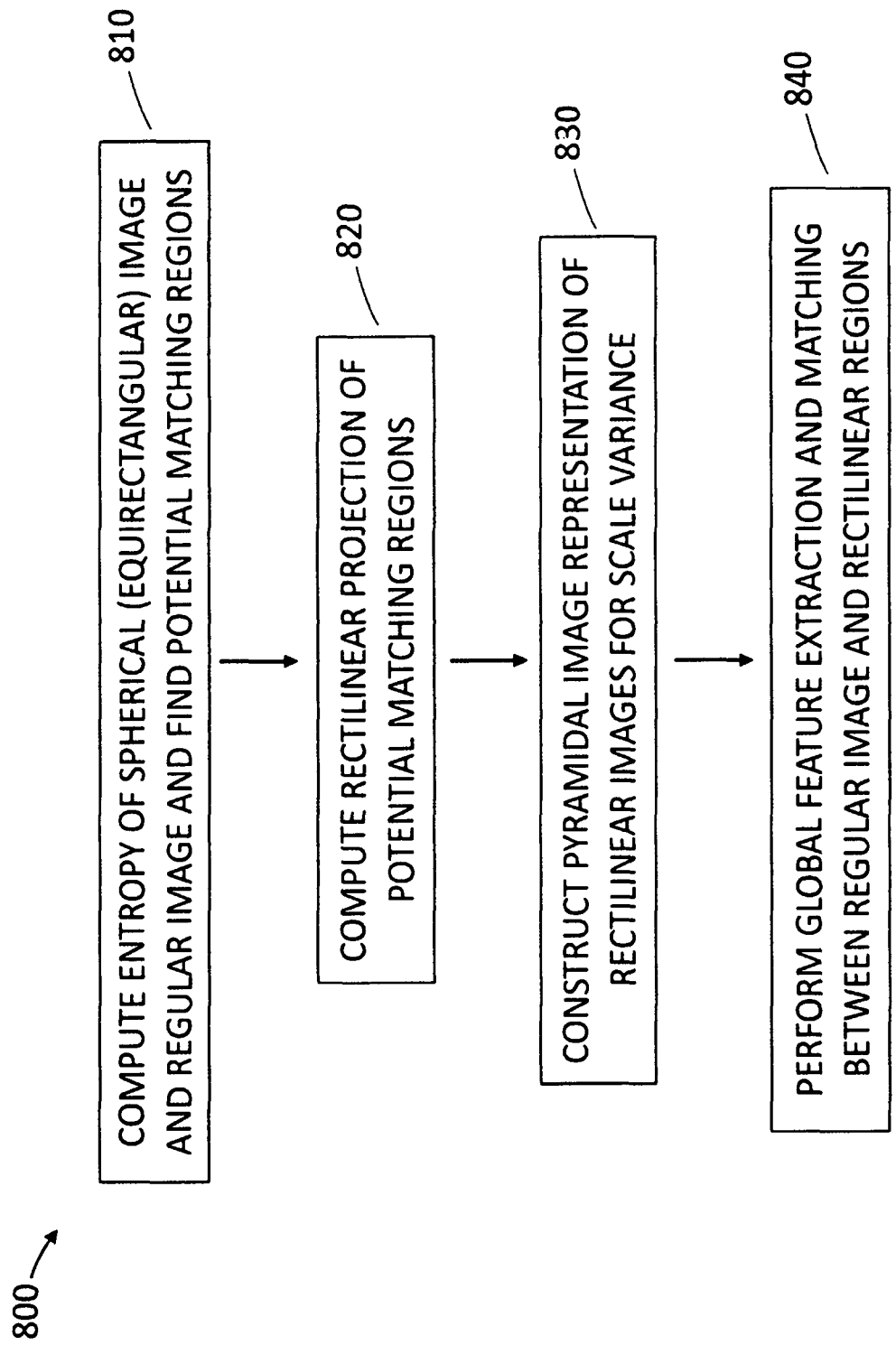

SPHERICAL IMAGE BASED REGISTRATION AND SELF-LOCALIZATION FOR ONSITE AND OFFSITE VIEWING

CROSS-REFERENCE TO RELATED APPLICATION

This application is a nonprovisional patent application of and claims the benefit of U.S. Provisional Patent Application No. 62/857,146 filed Jun. 4, 2019 and titled "System and Method for Spherically Based Image Registration and Self-Localization for Onsite and Offsite Viewing," the disclosure of which is hereby incorporated herein by reference in its entirety.

FIELD

The disclosure relates generally to systems and methods involving image registration and self-localization for onsite and offsite viewing, and specifically to systems and methods for spherical image based image registration and self-localization for onsite and offsite viewing, such as augmented reality viewing and virtual reality viewing.

BACKGROUND

A visual augmented reality system augments a user's experience with the real world by superimposing information onto the user's view of a scene. To render the information at the correct locations within the user's view, the system requires accurate self-localization of the computer device that represents the user's viewpoint with respect to the real world. Similarly, a visual virtual reality system provides the user with a virtual world that is represented by a graphic rendering of the real world and superimposes visual information on the virtual world through a computer device. Both types of systems can be represented by a single system which is typically composed of a computer device that directly interacts with the user and a set of communication and backend serving methods and equipment for data transmitting, processing, and storage.

Conventional approaches and methods for augmented reality and virtual reality rely on readings obtained from sensors onboard the computer device such as cameras, and motion, orientation, and location sensors for self-localization, and are not able to perform accurate and robust data rendering and data collection tasks without additional high-end high-accuracy peripheral instruments. Some other existing methods instrument the surrounding environment and set up external sensing coverage to track the computer device within. However, this is not feasible when the computer device is operated in field environments.

Accordingly, what is needed are improved systems and techniques to address these and other shortcomings of conventional augmented reality and virtual reality systems.

The disclosed systems and methods provide systems and methods for image registration and self-localization for onsite and offsite viewing, and specifically spherical image based image registration and self-localization for onsite and offsite viewing, such as augmented reality viewing and virtual reality viewing. In one embodiment, the computer device, representing the user's physical viewpoint, is a tablet computer with a touch screen, sensors for motion, location, and orientation, and a regular narrow-angle camera that is capable of capturing regular narrow-angle images of the environment and displaying them on the touch screen.

SUMMARY

Systems and methods are disclosed to improve the self-localization accuracy of a computer device used in augmented reality and virtual reality for indoor or outdoor operating environments via spherical image based image registration. Spherical image based image registration results in improved data rendering and an improved user collection experience. For example, a user's augmented reality experience is enhanced when the user is onsite, such as in a field environment, and a user's virtual reality data rendering experience is enhanced when the user is offsite, such as in an office environment.

The method has two stages: the capture stage and the localization stage.

At the capture stage, the system may comprise a computer device, a high-accuracy GNSS receiver, a spherical camera, and a server, and is used to capture the environment in the form of a series of spherical images. The locations and orientations of the series of spherical images are aligned with the real-world using data from the connected high-accuracy peripheral instruments. The spherical images are then processed and uploaded to the server.

At the localization stage, the system may comprise only the computer device and the server. The user may download the processed spherical images from the server to the computer device. If the user is onsite with the computer device, the system is able to localize the computer device accurately by matching the regular narrow-angle image stream from the onboard camera of the surrounding scenes against the processed spherical images taken at the approximate locations and fusing with the basic motion, orientation, and location data from the onboard sensors, without relying on any peripheral or external high-accuracy instruments.

Such an approach allows the system to deliver accurate augmented reality contextual overlays on top of the real-world scene to ensure any tasks the user performs and the results from those tasks based on the contextual overlays, such as data rendering and data recording, are reliable. Also, if the user is offsite with the computer device, the system provides the user with the virtual reality experience based on the spherical images with the contextual overlays viewed from the angles calculated using the onboard motion and orientation sensor data from the computer device. In one embodiment, a method of determining spherical image based self-localization is disclosed, the method comprising: providing a device comprising a device camera, a device communications module, a device processor, a device display, and a device orientation sensor, the device camera configured to collect device camera images; positioning a spherical camera within an operating environment, the spherical camera having a spherical camera field of view and a spherical camera communications module, the spherical camera configured to collect spherical camera images; displaying at least one fiduciary marker on the device display; positioning the device display within the spherical camera field of view; collecting device camera images; collecting spherical camera images comprising the at least one fiduciary marker on the device display; transmitting the spherical camera image data to the device communications module; determining a transformation of the device display with respect to the spherical camera using at least the spherical camera images; and determining an absolute device state using the transformation; wherein: the absolute device state comprises absolute device orientation and absolute device position; and spherical image based self-localization of the device is determined.

In one aspect, the method further comprises the step of receiving GNSS-measured device state data used in the determining a transformation of the device display, the GNSS-measured device state data comprising device orientation and device position. In another aspect, the method further comprises the step of receiving device orientation measurements from the device orientation sensor, the device orientation measurements used in the determining a transformation of the device display. In another aspect, the spherical camera further comprises a spherical camera communications module that transmits the spherical camera image data to the device communications module. In another aspect, the method further comprises the step of performing fiduciary recognition with respect to the spherical camera images. In another aspect, the method further comprises the step of performing estimation of a pose of the at least one fiduciary marker with respect to the spherical camera images. In another aspect, the at least one fiduciary marker comprises a synthetic rectangular marker of a wide black border and an inner binary matrix that contains encoded information. In another aspect, the method further comprises the step of rendering a contextual data overlay on the device display in an augmented reality view. In another aspect, the method further comprises the step of rendering a contextual data overlay on the device display in a virtual reality view. In another aspect, wherein the determining a transformation of the device step is associated with a weighted matching approach. In another embodiment, a system for determining spherical image based self-localization of an electronic device is disclosed, the system comprising: an electronic device comprising a device camera, a device communications module, a device processor, a device display, and a device orientation sensor, the device camera configured to capture device camera images; and a spherical camera operating with a spherical camera field of view and having a spherical camera communications module, the spherical camera configured to capture spherical camera images; wherein: at least one fiduciary marker is displayed on the device display; the device display is positioned within the spherical camera field of view; the device camera captures device camera images of an environment; the spherical camera captures images comprising the at least one fiduciary marker on the device display; the spherical camera communications module transmits spherical camera images to the device communications module; the device processor determines a transformation of the device display with respect to the spherical camera using at least the spherical camera images, and determines an absolute device state using the transformation, the absolute device state comprising an absolute device orientation and an absolute device position; and a spherical image based self-localization of the device is determined.

In one aspect, the absolute device orientation is a set of three device angular orientations of roll, pitch, and yaw, and the absolute device position is a set of three device positions of latitude, longitude and elevation. In another aspect, the device is a portable electronic device. In another aspect, the spherical camera is an omnidirectional spherical camera. In another aspect, the device processor further performs fiduciary recognition with respect to the spherical camera images and further performs estimation of a pose of the at least one fiduciary marker with respect to the spherical camera images. In another aspect, the device communications module receives GNSS-measured device state data used in determining the transformation of the device display, the GNSS-measured device state data comprising device orientation and device position. In another aspect, the device communications module receives device orientation measurements from the device orientation sensor, the device orientation measurements used in determining the transformation of the device display. In another aspect, the device display is configured to render a contextual data overlay on the device display in at least one of an augmented reality view and a virtual reality view. In another aspect, the at least one fiduciary marker comprises an inner binary matrix that contains encoded information.

In yet another embodiment, a method of determining spherical image based self-localization of an electronic device is disclosed, the method comprising: providing an electronic device comprising a device camera, a device communications module, a device processor, a device display, and a device orientation sensor, the device camera configured to collect device camera images; positioning a spherical camera within an operating environment, the spherical camera having a spherical camera field of view and a spherical camera communications module, the spherical camera configured to collect spherical camera images; displaying at least one fiduciary marker on the device display, the at least one fiduciary marker a synthetic rectangular marker of a wide black border and an inner binary matrix that contains encoded information; positioning the device display within the spherical camera field of view; collecting device camera images; collecting spherical camera images comprising the at least one fiduciary marker on the device display; transmitting the spherical camera image data from the spherical camera communication module to the device communications module; receiving GNSS-measured device state data comprising device orientation and device position; receiving device sensor orientation data from the device orientation sensor; performing fiduciary recognition with respect to the spherical camera images; performing estimation of a pose of the at least one fiduciary marker with respect to the spherical camera images; determining a transformation of the device display with respect to the spherical camera using at least the spherical camera images, the GNSS-measured device state data, and the device sensor orientation data; and determining an absolute device state using the transformation; wherein: the absolute device state comprises absolute device orientation and absolute device position; and spherical image based self-localization of the electronic device is determined.

The phrase "augmented reality" and the term "A/R" mean to superimpose computer-generated data, such as an image, sound, or other feature onto a user's view of the real world, thereby providing a composite, supplemented, or augmented view. For example, a web-based computer system may superimpose a three-dimensional model of a measuring tool within a field of view of a camera system.

The word "app" or "application" means a software program that runs as or is hosted by a computer, typically on a portable computer, and includes a software program that accesses web-based tools, APIs and/or data.

The word "archaeology" means the scientific study of the material human past, through excavation, survey, and related research.

The phrase "client-server" or "client-server architecture" means a shared computer architecture in which the server hosts, delivers and manages the majority of the resources (e.g. computing resources) and services to be consumed by a client. There may be multiple clients connected to a single server over a network or internet connection.

The phrase "constructed environment" means a derived or constructed environment representative of a real environment, e.g., a digitally created representation of a real environment.

The phrase "cloud computing" or the word "cloud" refers computing services performed by shared pools of computer resources, often over the Internet.

The phrase "user interface" or "UI", and the phrase "graphical user interface" or "GUI", means a computer-based display that allows interaction with a user with aid of images or graphics.

The phrase "three-dimensional pose" means three-dimensional position and three-dimensional orientation.

The phrase "on site" or "onsite" means near or adjacent to a real environment investigation site.

The phrase "off site" or "offsite" means other than near or adjacent to a real environment investigation site.

The phrases "operating environment" and "real environment" mean an actual real-life environment, e.g., an outdoor landscape or site including nature features such as earth, water, sky, etc.

The phrases "resource landscape," "resource site" and "resource site location" mean a geospatially identifiable landscape or site location which possesses characteristics of interest, such as a physical resource such as a hydrocarbon, botanical or cultural resource.

The phrase "archaeological resource landscape" or "archaeological resource site" mean a geospatially identifiable landscape or site which possesses the physical (i.e. material) remains of human activity.

The phrase "virtual reality" and the term "V/R" mean a computer-generated simulation or representation of a three-dimensional image or environment that may be interacted with in a seemingly real or physical way by a user using specialized electronic equipment, such as a helmet with a screen inside or gloves fitted with sensors.

The term "self-localization" means the ability of an entity to determine spatial position and spatial orientation using information or data provided by sensors onboard the entity.

The phrase "image registration" means the process of aligning two or more images of the same scene into one coordinate system, such as images obtained from a first camera creating rectangular images and from a second camera creating spherical images.

By way of providing additional background, context, and to further satisfy the written description requirements of 35 U.S.C. § 112, the following references are incorporated by reference in their entireties:

U.S. Provisional Pat. Appl. No. 62/623,341, filed Jan. 29, 2018 and titled "System and Method for Viewing, Analysis, and Data Collection of an Archaeological Operating Environment;" U.S. patent application Ser. No. 16/258,203 filed Jan. 25, 2019 and titled "System and Method for Dynamic and Centralized Interactive Resource Management;" U.S. Pat. No. 7,301,547 to Martins et al; U.S. Pat. No. 9,571,644 to Steiner; U.S. Pat. No. 9,652,896 to Jurgenson et al; U.S. Pat. No. 6,094,625 to Ralston; U.S. Pat. No. 8,773,465 to France; U.S. Pat. No. 9,196,094 to Ur; and U.S. Pat. No. 8,180,396 to Athsani et al; U.S. Pat. Appl. Publ. Nos. 2006/0152589 to Morrison et al; 2016/0337773 to Tsilfidis et al and 2015/0170256 to Pettyjohn et al; and non-patent literature documents "A Motion-Stabilized Outdoor Augmented Reality System" to Azuma et al, Proceedings of IEEE Virtual Reality '99 (Houston, Tex., 13-17 Mar. 1999), 252-259; and "Sensor Fusion for Augmented Reality" to Hol et al, Report no.: LiTH-ISY-R-2765, 9th International Conference on Information Fusion, Florence, 2006.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g. analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 8 is a flow diagram of one method of matching a regular narrow-angle image to a spherical image, and method of the spherical image based image registration and self-localization viewing system of FIGS. 1A-B.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-8. Generally, systems and methods to provide image registration and self-localization for onsite and offsite viewing are disclosed. In one embodiment, systems and methods for spherical image based image registration and self-localization for onsite and offsite viewing, such as augmented reality viewing and virtual reality viewing, are disclosed.

I. System Overview

Generally, the system comprises a computer device such as a tablet computer with motion, orientation, and location sensors, one or multiple regular narrow-angle cameras, and a touch screen that the user directly interacts with multiple peripheral devices connected to the computer device via wired or wireless connections, including a spherical camera and a high-accuracy GNSS receiver, and a remote server that the computer device communicates with for uploading and downloading the virtual world datasets. The method contains the capture stage and the localization stage, and each stage utilizes different sets of the components in the system.

Figure 1A:
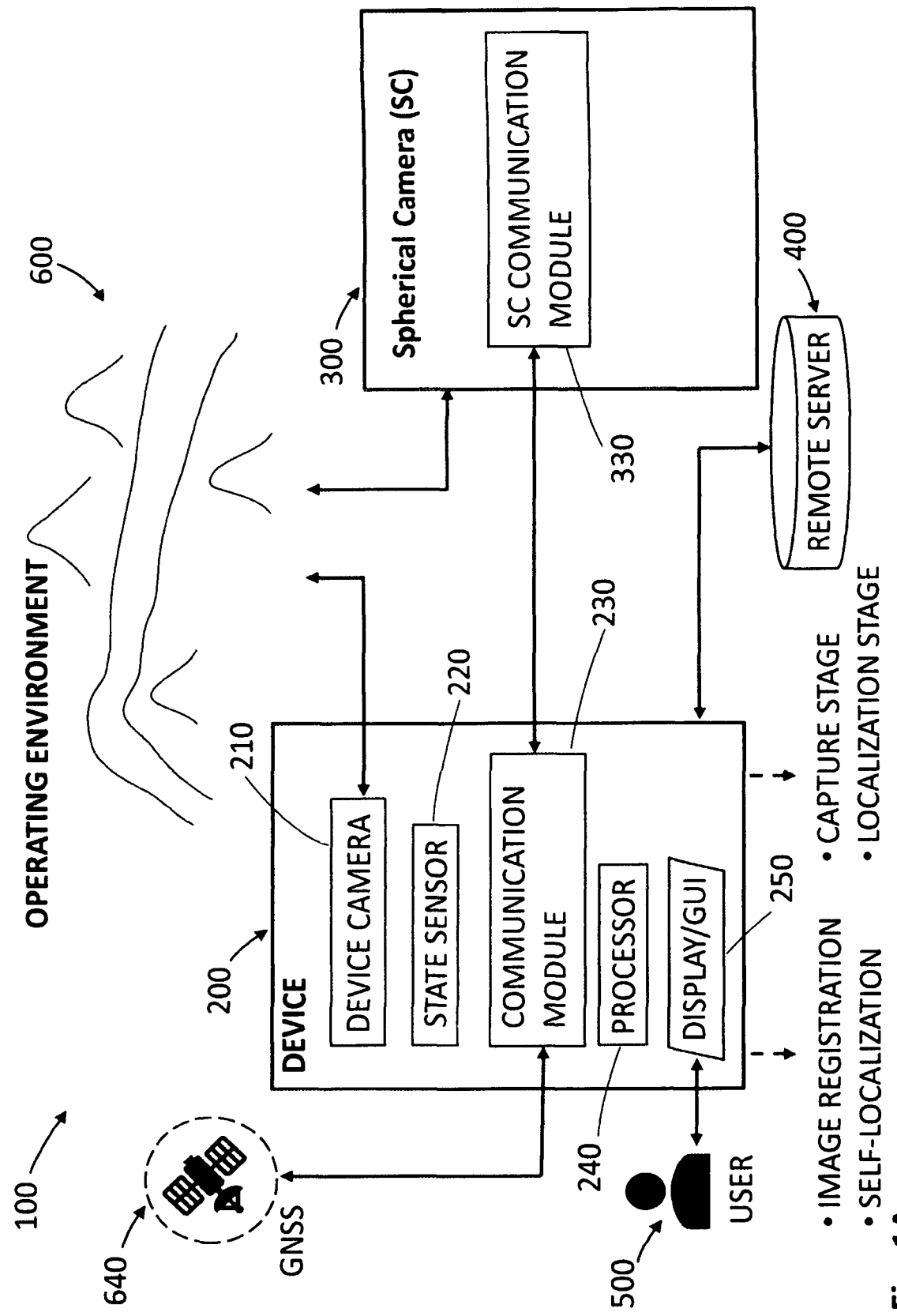
FIG. 1A is a schematic diagram of one embodiment of a spherical image based image registration and self-localization viewing system of the disclosure.
Figure 1B:
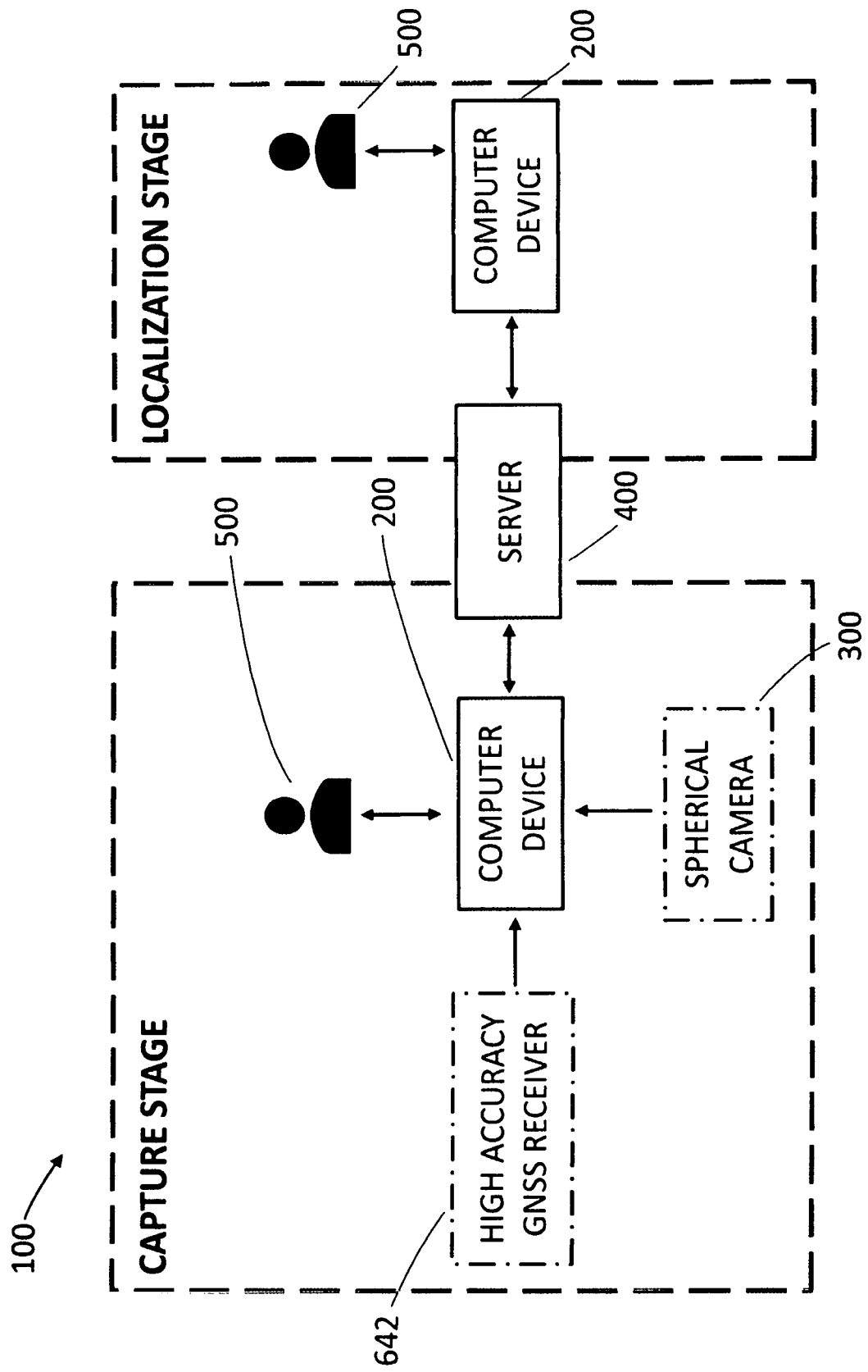
FIG. 1B is a companion schematic diagram of the embodiment of the spherical image based image registration and self-localization viewing system of FIG. 1A, detailing stage annotations.
Figure 1C:
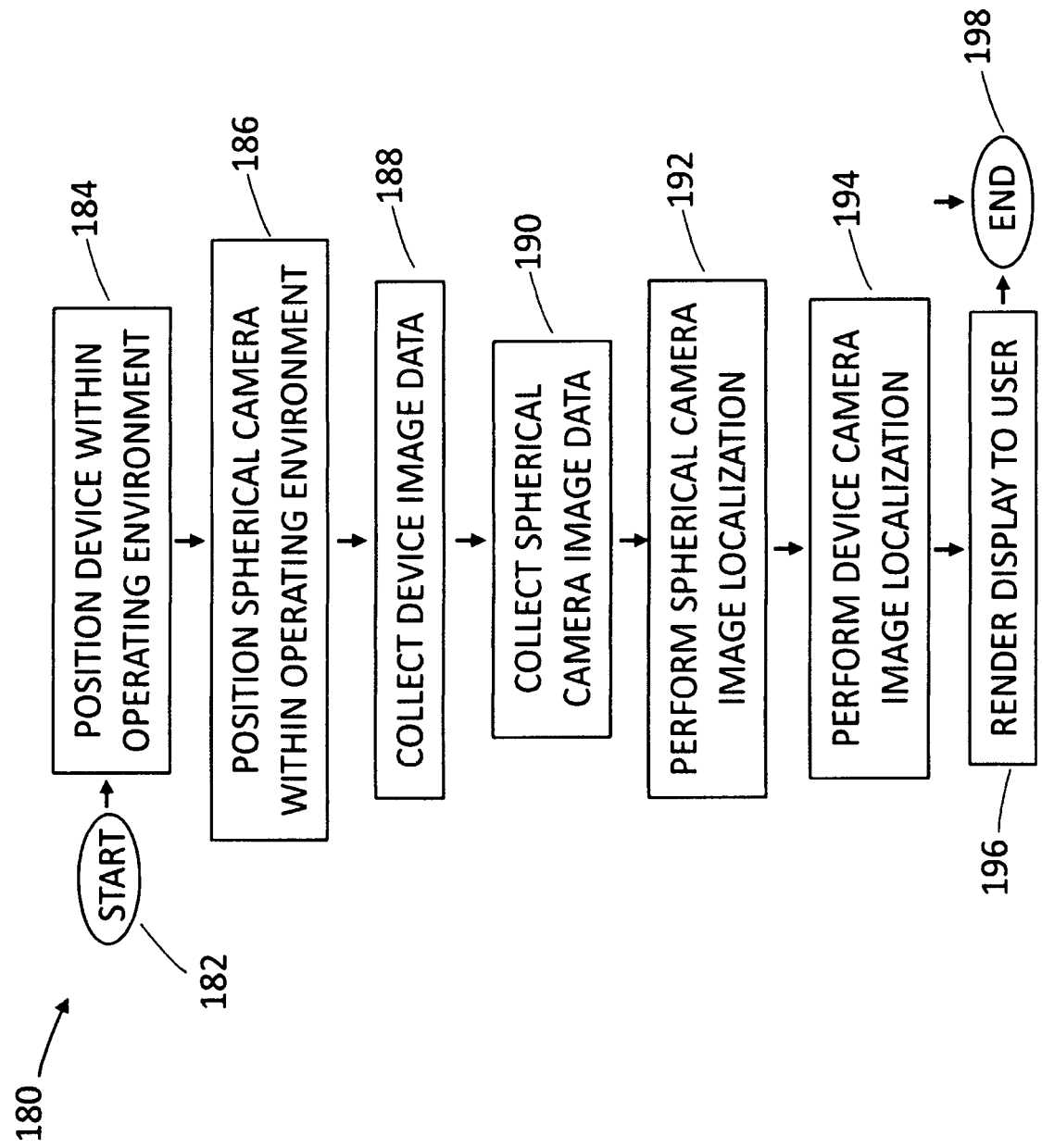
FIG. 1C is a companion flow diagram of one method of use of the spherical image based image registration and self-localization viewing system of FIG. 1A.
Figure 2:
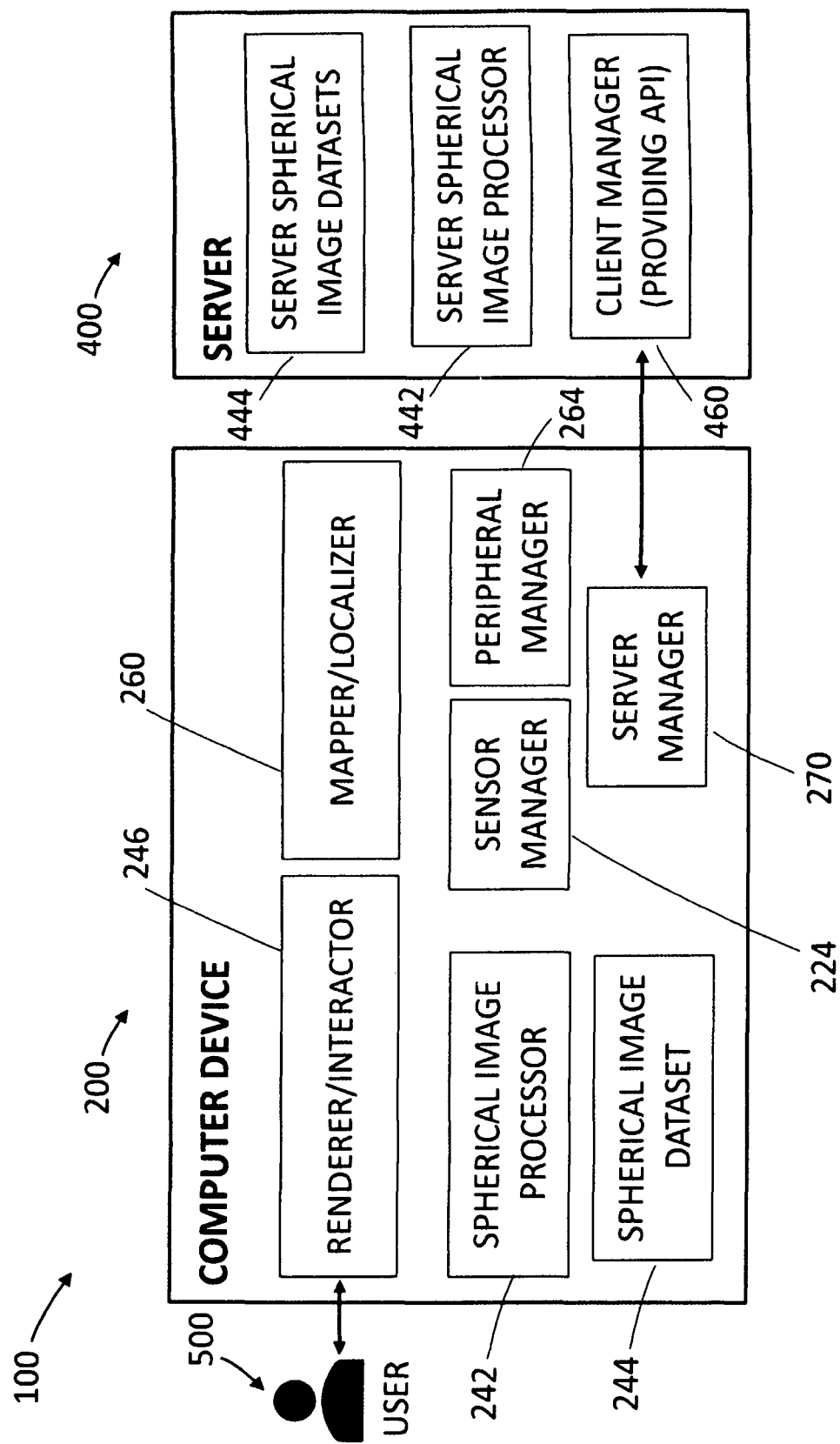
FIG. 2 is a schematic diagram detailing software components of the spherical image based image registration and self-localization viewing system of FIGS. 1A-B.

With attention to FIGS. 1A-B and 2, an overview of a system for spherical image based image registration and self-localization viewing 100, i.e. the "system" is presented. FIG. 1A is a schematic diagram of the system 100. FIG. 1B is a companion schematic diagram of the spherical image based image registration and self-localization viewing system 100 of FIG. 1A, detailing stages, phases, or modes of the system 100. FIG. 2 provides another schematic diagram of the system 100 from a software perspective, with further detail regarding the device 200 and remote server 400 components of the system. FIG. 1C is a companion flow diagram of one method of use of the system 100 of FIGS. 1A-B and 2.

With particular attention to FIG. 1A, the system for spherical image based image registration and self-localization viewing 100 comprises a device 200, a spherical camera 300, and a remote server 400. The device 200 and the spherical camera 300 interact with an operating environment 600, such as an outdoor operating environment, as depicted, or an indoor environment. The device 200 may also interact or communicate with an external navigation system 640, such as the global navigation satellite system (GNSS) depicted. The system 100 operates to provide functions to include image registration and self-localization. The system 100 may operate in at least two stages or modes, such as capture stage and localization stage. A user 500 interacts with the system 100 by way of the device 200.

The device 200 comprises a device camera 210, a device state sensor 220, a device communication module 230, a device processor 240, and a device display/GUI 250. The device camera 210 is configured to image or collect device image data from an operating environment 600. The device camera 210 may be of any camera type known to those skilled in the art, to include a visible band camera, infrared camera, and the like. The device camera 210 may create generally rectangular images and may collect a stream or set of images. The device camera 210 may be a video camera and may be physically integrated with the device 200. The device camera 210 may be configurable, e.g. focal length may be adjustable. The device camera 210 may be a set of cameras, e.g. a visible band camera and an IR camera, a first visible band camera with a first set of characteristics and a second visible band camera with a second set of characteristics. The characteristics of a given device camera comprise focal length and other camera characteristics known to those skilled in the art.

The device state sensor 220 may measure or sense orientation of the device 200, such as three-axis orientation of roll, pitch, and yaw. The device state sensor 220 may measure or sense position of the device 200, such as (x,y,z) position in any given coordinate system or as latitude, longitude, and elevation. The elevation may be expressed as MSL elevation. The device state may be defined as six degree of freedom state, e.g. as device orientation plus device position. The state sensor 220 may interact with or couple with an external sensor to determine device state. For example, the state sensor 220 may provide position and orientation of the device and interact with a GNSS sensor of an external navigation system 640 that provides one or both of position and orientation of the device.

The device communication module 230 may communicate or interact with external entities, such as the spherical camera 300 and/or an external navigational system of device, e.g. a GNSS. In one embodiment, the device communications module 230 communicates or interacts with the spherical camera communication module 330 and/or the remote server 400.

The device processor 240 may perform any variety of processing or computing functions of the device, to include partial or complete processing of device image data collected by the device camera 210, spherical camera 300 image data, device state sensor 220 data to include synthesizing or blending of state sensor data and external navigational data, rendering of presentations or images to the device display/GUI 250, etc.

The display/GUI 250 may provide any of several functions, to include user 500 selection of display modes (e.g. V/R, A/R modes), selection of image processing terms or characteristics (e.g. setting or placement of fiducial markers, described below), selection of camera mode or types, pointing or orientation of the device 200 relative to the operating environment 600, and system 100 operating modes (e.g. capture or localization).

The spherical camera 300 comprises a spherical camera communications module 330. The spherical camera communications module 330 communicates with or interacts with the device 200. In one embodiment, the spherical camera communications module 330 communicates with or interacts with the device communications module 230 by way of any known means, to include wireless communications, physical (e.g. wire) connection, etc.

The spherical camera 300 is configured to image or collect spherical camera image data. The spherical camera image data may comprise individual images or a sequence or set of images. The spherical camera 300 may be any type of spherical camera known to those skilled in the art, to include a visible band spherical camera, IR band spherical camera, video spherical camera, and omnidirectional spherical camera.

FIG. 1B provides a schematic diagram of the embodiment of the spherical image based image registration and self-localization viewing system 100, detailing stages or modes of operation. In the capture stage, a user 500 interacts with computer device 200. The computer device 200 receives high accuracy positional data etc. from a GNSS Receiver 642 and data from spherical camera 300, and outputs to server 400. The server 400, by way of computer device 200 and with user input 500, performs localization.

FIG. 1C provides a flow diagram of one method of use 180 of the spherical image based image registration and self-localization viewing system 100. Generally, the method starts at step 182 and ends at step 198. Any of the steps, functions, and operations discussed herein can be performed continuously and automatically. In some embodiments, one or more of the steps of the method of use 180, to include steps of the method 180, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be one or both of one or more onsite users and one or more offsite users. A user may interact or perform one or more of the described steps be using a display/GUI as described above.

After starting at step 182, the method 180 proceeds to step 184 wherein the device 200 is positioned relative to or within the operating environment 600. The device 200 may be oriented and/or positioned by the user 500 through the device display/GUI. The user 500 may also configure the device 200 components, such as the device camera 200 configuration, by way of the device display/GUI, select mode or stage of operation, e.g. capture stage or localization, and select viewing mode, e.g. A/R or V/R. After step 184, the method proceeds to step 186.

At step 186, the spherical camera 300 is positioned relative to or within the operating environment 600. The spherical camera 300 may be oriented and/or positioned by the user 500 through the device display/GUI, and/or may be configurable through direct communication with the spherical camera communication module. The user 500 may configure the spherical camera such as the spherical camera 300 focal length, etc. At one or both of steps 184 and 186, the user 500 may select or arrange image processing items, such as fiducial markers, on or within one or both of the device camera images and the spherical camera images. After completing step 186, the method 180 continues to step 188.

At step 188, the device camera images or collects device image data. The device image data may be stored, completely or partially, within the device 200, or may be stored, completely or partially, on the remote server 400. The device image data may be processed, completely or partially, within the device 200 by way of the device processor, or may be processed, completely or partially, on the remote server 400. After step 188, the method 180 continues to step 190.

At step 190, the spherical camera images or collects spherical camera image data. The spherical camera image data may be stored, completely or partially, within the device 200, or may be stored, completely or partially, on the remote server 400. The spherical camera image data may be processed, completely or partially, within the device 200 by way of the device processor, or may be processed, completely or partially, on the remote server 400. After step 188, the method 190 continues to step 192.

At step 192, spherical camera image localization is performed, as described below. After step 192, the method 190 continues to step 194.

At step 194, device camera image localization is performed, as described below. After step 194, the method 190 continues to step 196.

At step 196, a display is rendered on the display/GUI for presentation to the user 500. The rendering may be of any of several types, to include A/R and V/R display, flat two-dimensional display of fused images of the images captured by each of the device camera and the spherical camera, and other displays known to those skilled in the art. After step 196, the method 190 ends at step 198.

As generally noted above, some steps of the method 180 may be omitted and some steps added. Specifically, with reference to the two principal modes or stages of operation (described in more detail below), some steps may be omitted and/or added. For example, during capture stage operations, steps 184, 186, 190, and 192 may be performed, steps 188, 194, and 196 omitted, and an additional step of loading of the images to a remote server added. Stated another way, during capture stage operations, image data may be collected by the spherical camera and localized with regard to the operating environment, and display rendering may not be executed. Instead, the collected image data may be stored on a remote server for subsequent use for device camera image localization and/or display rendering. As another example, during localization stage operations, steps 186, 190, and 192 may not be performed, and instead an additional step of accessing previously collected spherical camera image data may be added, while preserving steps 184, 188, 194, and/or 196. The image data may be accessed via a remote server.

Figure 3:
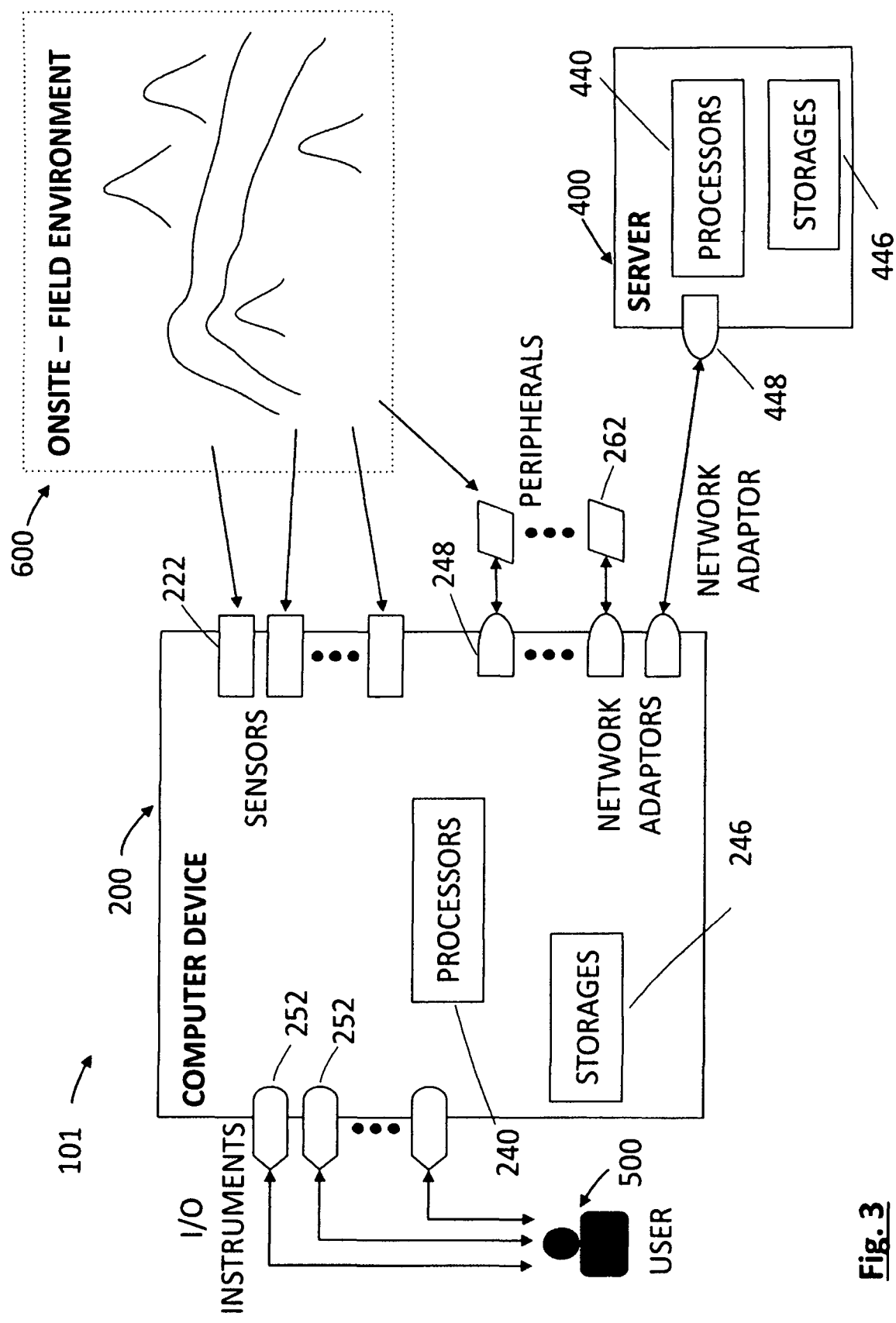
FIG. 3 is a schematic diagram detailing components of the capture stage of the spherical image based image registration and self-localization viewing system of FIGS. 1A-B.

With attention to FIGS. 2 and 3, additional schematic diagrams of the system 100 are provided, the diagrams from complementary user/software perspectives.

User 500 interacts with the computer device 200 by way of render/interactor 246. The render/interactor 246, among other things, renders images and/data as derived from images and/or data collected by the spherical camera. The spherical camera provides collected data to the spherical image dataset 244, such data processed by the spherical image processor 242. The sensors and peripherals (e.g. a high accuracy GNSS receiver 642) are managed, respectively, by the sensor manager 224 and peripheral manager 264. Some processing requirements of the computer device 200 may be executed by the mapper/localizer 260. The localizer/mapper 260 may enable specialized user views of an operating environment 600 as presented by the render/interactor 246, such as augmented reality views or virtual reality views. A server manager 270 of the computer device 200 interacts or communicates with the server 400. The server 400 comprises a client manager 460 (providing, among other things, API) which interacts or communicates with the server manager 270. The server 400 further comprises a server spherical image processor 442 which processes images and/or data collected by the spherical camera. Images of the spherical camera, as gathered together or related to one another, are collected in server spherical image datasets 444.

II. Capture Stage Operations

Figure 4:
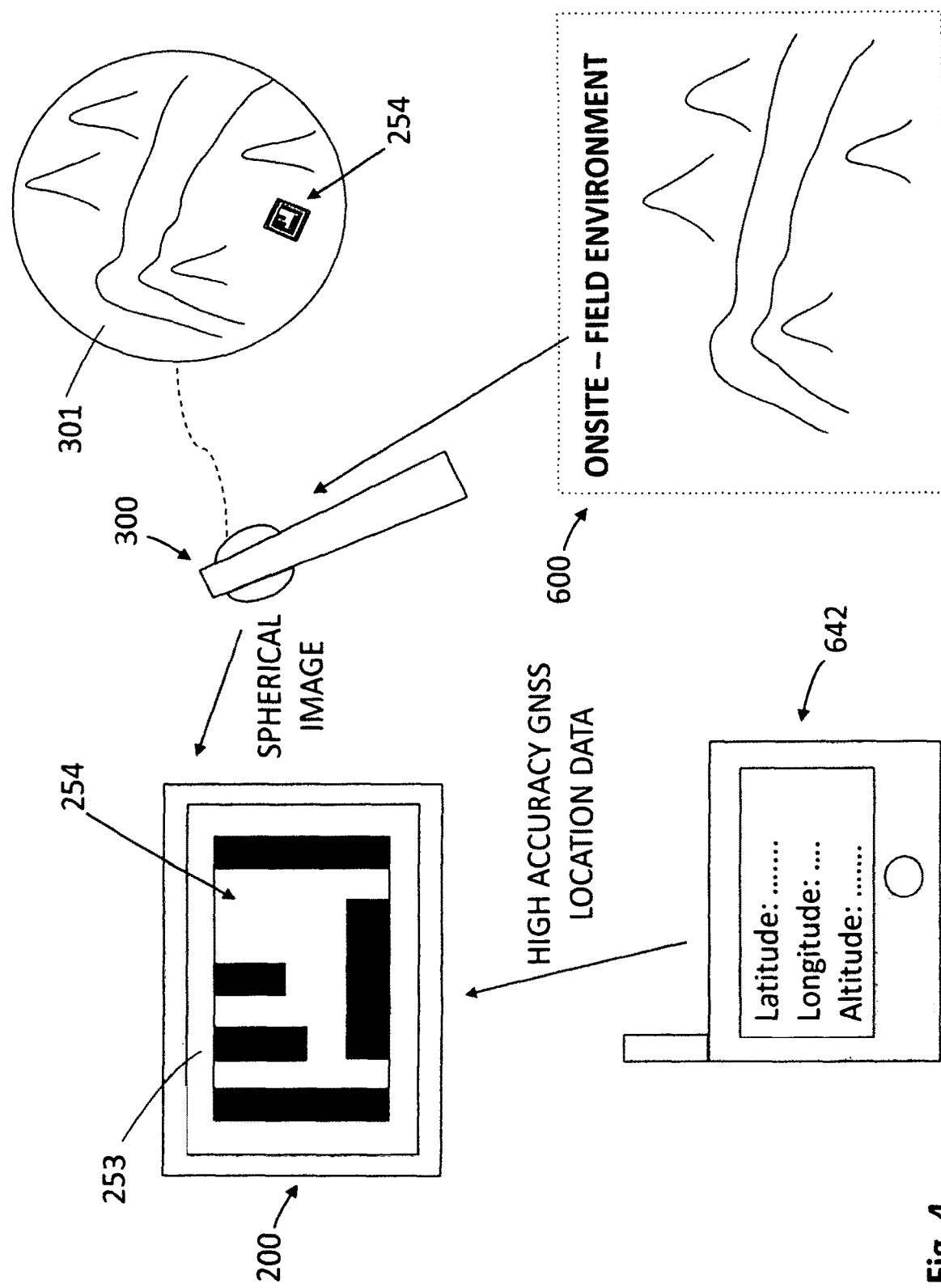
FIG. 4 depicts aspects of the configuration of the spherical image localization through fiducial rectification of the FIG. 3 capture stage of the spherical image based image registration and self-localization viewing system.
Figure 5:
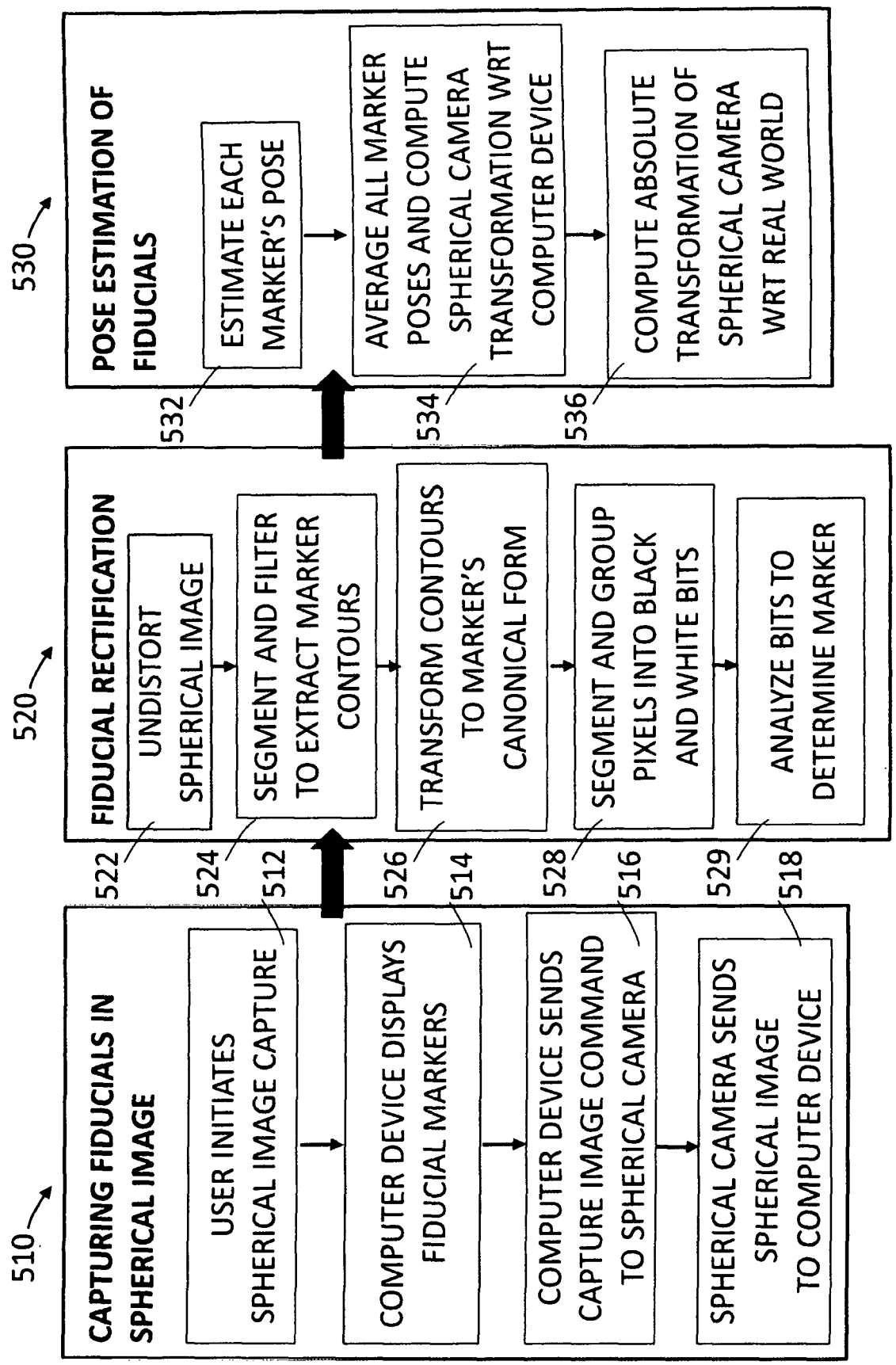
FIG. 5 depicts aspects of the method of spherical image localization through fiducial rectification of the FIG. 3 capture stage of the spherical image based image registration and self-localization viewing system.

With particular attention to FIGS. 3-5, capture stage operations of the spherical image based image registration and self-localization viewing system 100 may utilize several components, including the computer device, the spherical camera, the high-accuracy GNSS receiver, and the remote server, to capture spherical images of the environment whose locations and orientations are aligned with the real world based on the high-accuracy GNSS receiver data. FIG. 3 depicts the spherical image based image registration and self-localization viewing system 100 in a capture stage, detailing utilized components. The spherical images are then uploaded to the remote server 400 after processing.

As provided in FIG. 4, a spherical camera 300 interacts with a computer device 200 of a user 500, the spherical camera 300 capturing images in a field environment 600 that include images of the computer device 200 itself (depicted as element 301 in FIG. 4). Because the computer device 200 is displaying one or more fiducial markers 254, the captured spherical images of the computer device 200 includes the displayed one or more fiducial markers 254. As a result, the location and orientation of a spherical image is obtained with respect to the computer device 200 via rectifying the fiducial markers 254 displayed on the touch screen 253 of the computer device 200 as captured in the spherical image. Also, the computer device 200 obtains its own absolute location and orientation with respect to the real world (that is, localization of the computer device 200) with use of the high-accuracy GNSS receiver 642 and onboard orientation sensors 22 of the computer device 200. Note that in some embodiments, the one or more fiduciary markers comprise embedded data.

The process or method 500 to perform spherical image localization at capture will now be described, with attention to FIG. 5.

A. Capturing Fiducials in a Spherical Image

As provided in element 510 of FIG. 5, a set of four elements are performed to result in capturing fiducial markers in a spherical image. At element 512, a user 500 initiates a spherical image capture by interaction with display/GUI 250 of computer device 200. At element 514, one or more fiduciary markers 254 are displayed on the computer device 200. A user 500 may adjust one or more of the fiduciary markers 254. At element 516, a command or control signal is transmitted to the spherical camera 300 to capture one or more images of the computer device 200 with associated display of the one or more fiduciary markers 254 presented or displayed on the display/GUI 250. The command or control signal may be automatically sent by the computer device 200 or may be triggered by the user 500. At element 528, the spherical camera 300 transmits the captured one or more spherical camera images to the computer device 200.

A fiducial marker (aka a "marker") 254 may be a synthetic rectangular marker composed of a wide black border and an inner binary matrix that contains encoded information. (Other configurations of synthetic markers are possible, as known to those skilled in the art.) Marker images may be generated in advance and have a unique ID. A singular marker or a plurality of markers 254 may be generated and kept ready to be displayed on the computer device 200. Fiducial markers are displayed on the computer device screen to facilitate the computation of the relative location and orientation of a spherical camera 300 with respect to the computer device 200 when the computer device 200 is captured in the spherical image.

In one embodiment, the spherical camera 300 is connected to the computer device 200 via Wi-Fi and image capture commands are sent from the computer device 200. As generally discussed above, when the user 500 needs to capture a spherical image, the computer device 200 displays one fiducial marker 254 or a grid of fiducial markers 254 on the screen (e.g. on the display/GUI 250) and sends a capture command to the spherical camera 300. The fiducial markers 254 stay on the screen until the computer device 200 receives the spherical image. The received spherical image, as it captures the entire visual information of the surrounding environment 600, contains the fiducial markers 254 that were displayed on the computer device 200.

In one embodiment, the fiducial marker is an ArUco marker. In one embodiment, the fiducial marker is any available fiducial marker that has adequate position and orientation tracking and information encoding capabilities, including but not limited to, ArUco, QR, ARToolkit/artookitX, AprilTags, etc. In one embodiment, the fiducial marker is a custom marker such as a custom marker created or developed by a user.

By way of providing additional background, context, and to further satisfy the written description requirements of 35 U.S.C. § 112 regarding fiducial markers, the following references are incorporated by reference in their entireties: "Speeded up detection of squared fiducial markers", Francisco J. Romero-Ramirez et al, *Image and Vision Computing*, vol 76, pages 38-47, 2018; "Generation of fiducial marker dictionaries using mixed integer linear programming", S. Garrido-Jurado et al, *Pattern Recognition:* 51, 481-491, 2016; U.S. Pat. Nos. 5,726,435, 5,691,527; 7,032,823; "Marker tracking and HMD calibration for a video-based augmented reality conferencing system", Hirokazu Kato et al, *Proceedings of the 2nd International Workshop on Augmented Reality*, pgs. 85-94, 1999; and "AprilTag: a robust and flexible visual fiducial system", Edwin Olson, *Proceedings of the IEEE International Conference on Robotics and Automation*, pgs. 3400-3407, 2011.

B. Fiducial Rectification

As provided in element 520 of FIG. 5, a set of five elements are performed to result in fiducial rectification.

With the capture of a spherical image, the method 500 next generally detects the fiduciary markers 254 and calculates the positions and the corresponding ID's of the markers 254. Because spherical images have inherent distortion, the spherical images, at element 522, must be undistorted before identifying marker candidates. The method of undistorting spherical images is described below with respect to matching a regular image to a spherical image. The undistorted image is then used to detect the fiducial markers.

First, at element 524, an adaptive threshold is used to segment the markers, and then local contours are extracted from the thresholded image with a filtering technique to remove contours that are too big and those too close to one another. Candidates that do not approximate to rectangular shapes are discarded. Then, at element 526, perspective transformations are applied to the candidates to obtain their canonical forms. The canonical images are then, at element 528. thresholded to separate the white and black pixels. Each image is divided into different cells based on the marker size and the border size. The amount of black and white pixels on each cell is counted to categorize as a white bit or a black bit. Finally, at element 529, the bits are analyzed to determine if the candidate is actually a marker and belongs to a specific dictionary.

This technique is able to detect multiple markers at once, which addresses the scenario of a grid of markers displayed on the computer device screen.

C. Pose Estimation of Fiducials

As provided in element 530 of FIG. 5, a set of three elements are performed to result in pose estimation of the fiducial markers.

Estimation of the pose of the marker in the spherical image provides the pose of the computer device 200 with respect to the spherical camera 300. When a plurality of fiducial markers 254 is used, at element 532 the pose of each marker in the marker grid is individually determined. At element 534, an average transformation is calculated to obtain the overall transformation of the computer device screen with respect to the spherical camera. By taking the inverse of this transformation, one may obtain the relative transformation of the spherical camera with respect to the computer device. At element 536, a final transformation fusing the data from the high-accuracy GNSS receiver and the onboard orientation sensors yields the absolute location and orientation, including latitude, longitude, altitude, roll, pitch, and yaw with respect to the real world, of the spherical image.

D. Matching Spherical Image to Another Spherical Image

A series or set of captured spherical images require matching between spherical images. In one matching procedure, visual odometry is computed to determine the orientation of a current spherical image with respect to a previous image only using visual information obtained from the spherical images. The visual information, extracted as features in an image, are key points that capture a particular aspect of the image (for example edges, lines, intensity, geometric patterns, color, etc.). The method takes two spherical images and analyzes each image using robust spherical binary local feature detectors and descriptors.

In one embodiment, features are formed on a nearly regular hexagonal grid parameterization of the sphere called the geodesic grid. For each geodesic grid, features are extracted. When two query images are provided for registration, the method compares all features extracted from one spherical image to those from the other. When a pair of key points from different images have a similar descriptor, they are labeled as a potential match. A minimum number of such matches needs to be found in order to determine the orientation difference between two spherical images, i.e., given two spherical images, corresponding matching key points are obtained, and based on the relative pixel position in each of the images, the absolute orientation difference is calculated between the images.

Calculation of the orientation difference between two spherical images serves as a foundation of spherical-based image registration. This procedure improves registration accuracy, which is critical in situations when the computer device's motion and orientation sensors provide uncertain readings and make the augmented reality contextual overlays inaccurate.

III. Localization Stage Operations

Further details of localization stage operations of a spherical image based image registration and self-localization viewing system are provided below.

Figure 6:
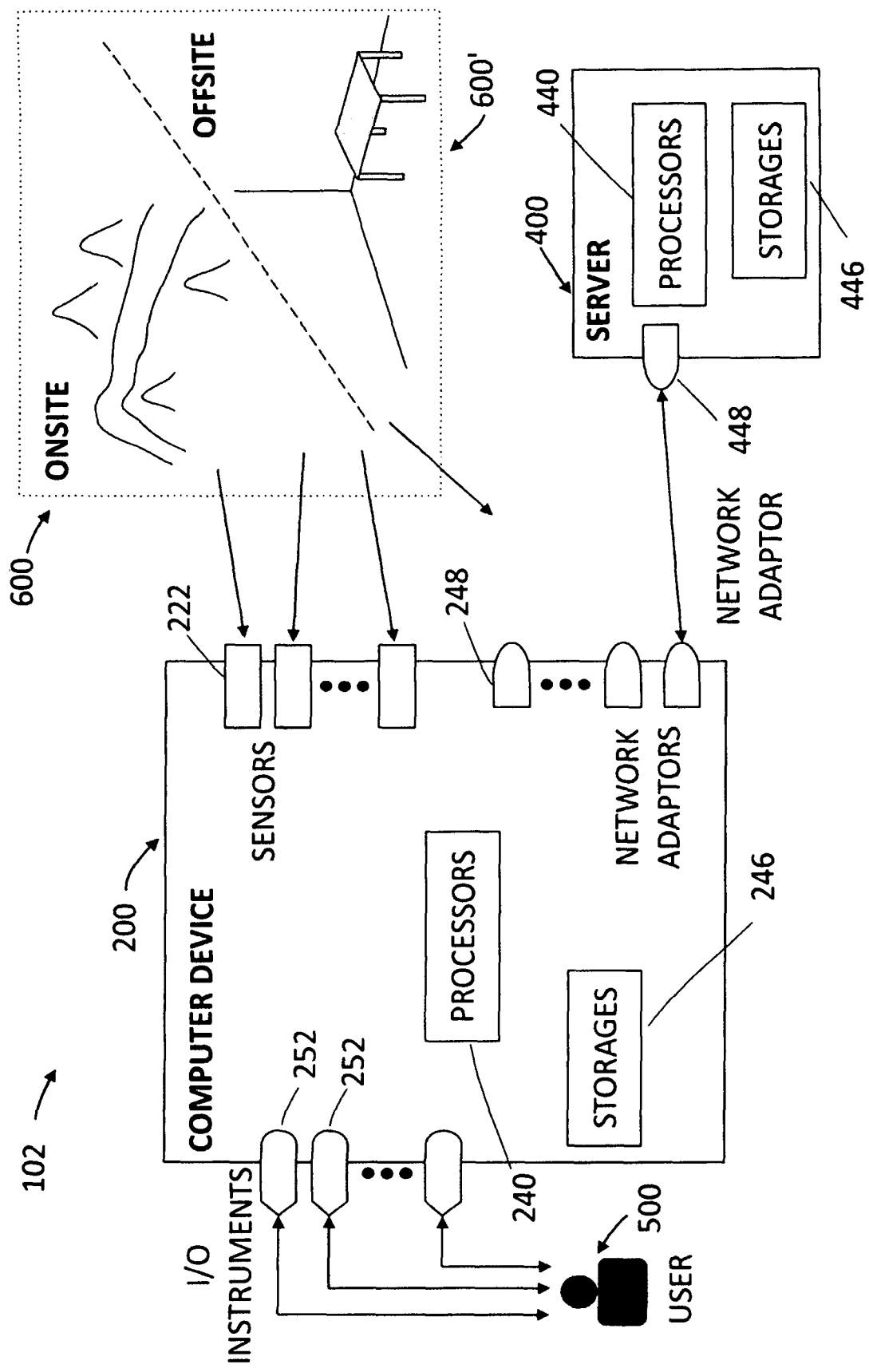
FIG. 6 is a schematic diagram detailing components of the localization stage of the spherical image based image registration and self-localization viewing system of FIGS. 1A-B.

FIG. 6 provides a system overview of the spherical image based image registration and self-localization viewing system 102 as configured for localization operations, showing the system operating against either an onsite environment 600 or an offsite environment 600'. The system 102 of FIG. 6 is similar to that of the system 101 of FIG. 3, except some elements or components are not required, e.g. the peripherals 248.

A. Localization Stage—Onsite with Augmented Reality

Figure 7A:
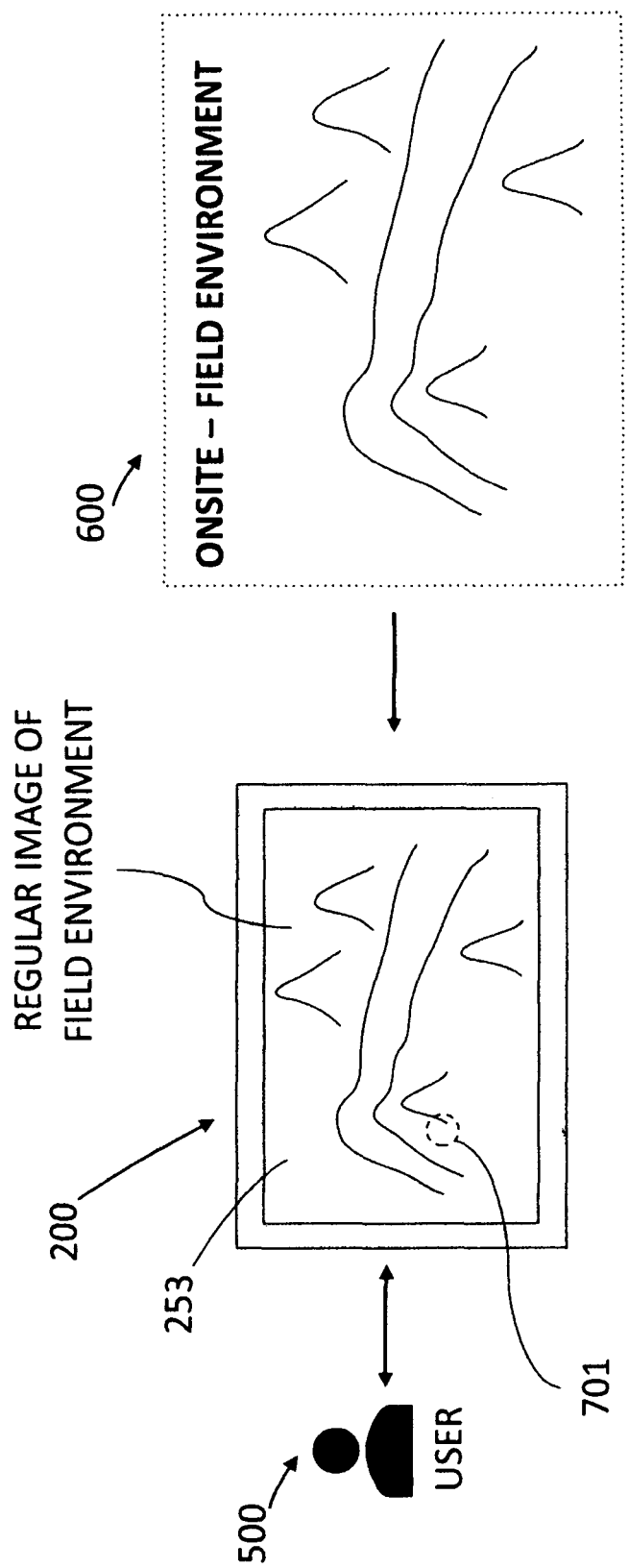
FIG. 7A depicts aspects of an onsite augmented reality scenario of the FIG. 6 localization stage of the spherical image based image registration and self-localization viewing system of FIG. 3.

FIG. 7A provides a more detailed view of the spherical image based image registration and self-localization viewing system 102 of FIG. 6 in which the system is operating in an onsite environment in an augmented reality mode. A contextual overlay feature 701 is depicted as presented on the display/GUI 253 of the computer device 200.

In one embodiment, the localization stage may only require the user 500 to use the computer device 200 and the remote server 400. After the computer device 200 downloads the relevant processed spherical images from the server 400, if the computer device 200 is situated onsite at the approximate locations where the spherical images were recorded, registration of the regular narrow-angled images from the device camera 210 onboard the computer device 200 against the spherical images is performed to accurately localize the computer device 200. Such an approach is performed without using any high-accuracy peripheral or external localization instruments.

B. Localization Stage—Offsite with Virtual Reality

Figure 7B:
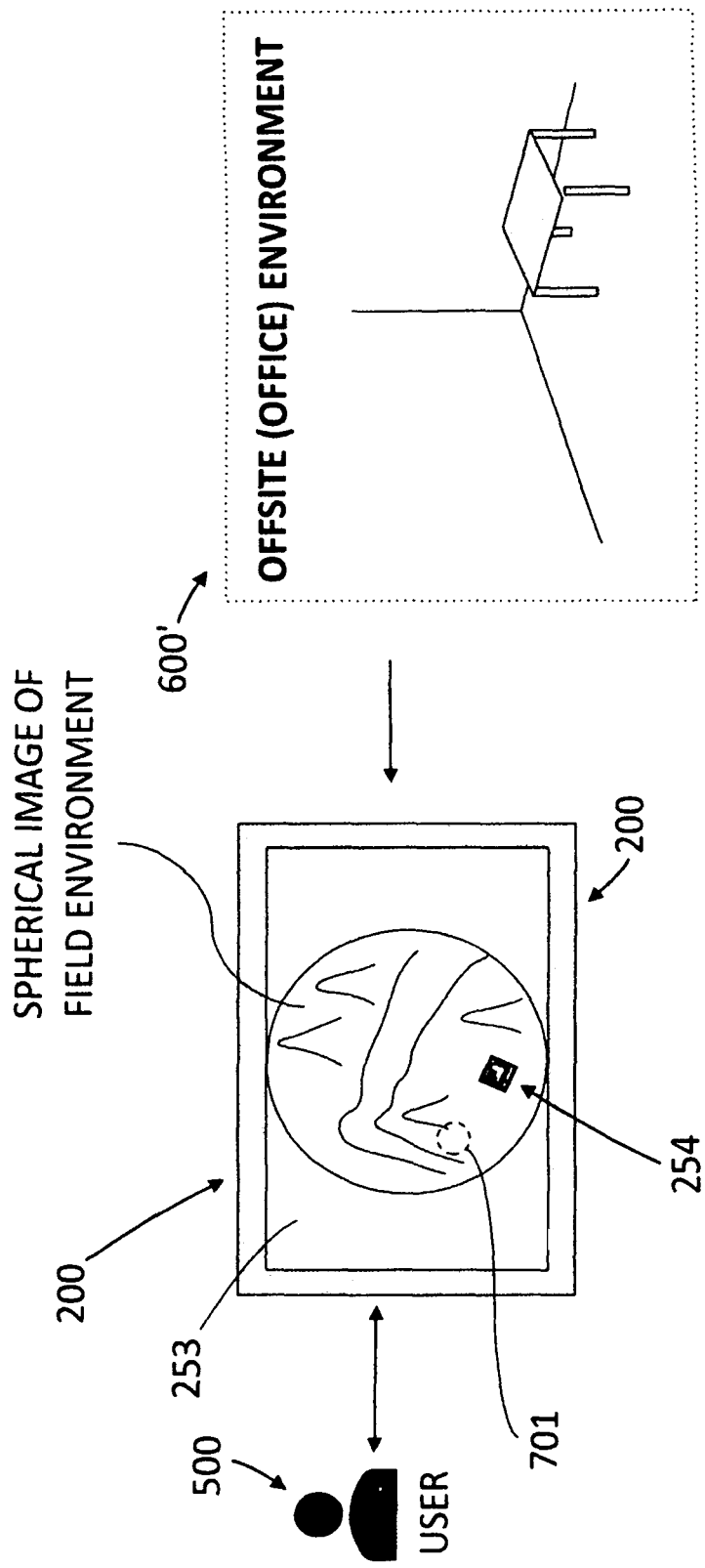
FIG. 7B depicts aspects of an offsite virtual reality scenario of the FIG. 6 localization stage of the spherical image based image registration and self-localization viewing system of FIG. 3.

FIG. 7B provides a more detailed view of the spherical image based image registration and self-localization viewing system 102 of FIG. 6 in which the system is operating in an offsite environment in a virtual reality mode. A contextual overlay feature 70*l* and a fiduciary marker 254 are depicted as presented on the display/GUI 253 of the computer device 200.

At the localization stage, if the computer device 200 is used in an offsite environment 600' and the user chooses to view the contextual data and the collected data of the field environment 600, the method may render the corresponding spherical images in virtual reality according to the location set by the user. The orientation of the computer device 200 is calculated based on the onboard orientation sensor readings, which then determines the user's virtual viewpoint and the locations on the spherical image where the data are rendered C. Matching Regular Image to Spherical Image Registering images of similar view angles has been performed in computer vision applications. However, registration of images with large view angle differences poses unique and unexpected challenges which include inconsistent image representation spaces, inconsistent color grading, scale difference, etc. The process or method 800 of registering the narrow-angle images from a regular camera onboard a computer device with the distorted spherical images from a spherical camera consists of a number of elements identified in FIG. 8 as elements, 810, 820, 830, and 840. FIG. 8. This method addresses and solves the unique and unexpected challenges of registration of images with large view angle differences.

1. Equirectangular Projection of Spherical Image and Potential Matching Regions)

A spherical image may be represented using an equirectangular projection, and then viewed as a two-dimensional image. The equirectangular projection maps from the latitude/longitude-based spherical coordinate system to the Cartesian coordinate system. However, the resulting image obtained by the equirectangular projection exhibits regional distortion—the region in the middle of the image is spatially compressed, while the top and the bottom are stretched.

At element 810 of the method 800, a spherical image is converted to an equirectangular image using the equirectangular projection. The regions in an equirectangular image that may match a regular narrow-angle image may be found by calculating the entropy of each of the regions. As entropy encodes the average information contained in an image, the method uses the entropy information from both the equirectangular image and the regular image to identify potential matching regions, which narrows down the search space and reduces the computational burden on the computer device.

2. Spherical Image Undistortion into Rectilinear Images

Once potential matching regions are identified based on the entropy of the images, the method 800, at element 820, computes the actual homography between the regular image and the spherical image, which requires the rectilinear projection of the equirectangular image.

A rectilinear projection keeps straight lines straight, with little or no barrel or pincushion distortion, but has a restricted field of view which can be set to match the field of view of the computer device's regular camera. The rectilinear images are obtained by Gnomonic projection that is a projection achieved by projecting the ray of light from the center of the sphere through the surface of the sphere onto a point in a plane that is tangent to the sphere, which forms a corresponding pixel. This projection is performed for all pixels in the field of view to obtain a rectilinear image. Similarly, an inverse projection is designed to recover the spherical image from a rectilinear image. This inverse projection is particularly helpful for overlaying contents to a spherical image for immersive experience in AR and VR applications.

3. Pyramidal Structure for Scale Variance

Once rectilinear images are computed from different regions of the spherical images, one must find the best match. The best match performed at element 830 by converting rectilinear images extracted from the spherical image and the regular image to the feature space, and then performing a comparison based on the distance metric. Although computing the similarity of two images has been studied in computer vision applications, the real-world problem in the subject scenario is more challenging, due to scale differences between images caused by user movements and linear perspective changes, for example. Thus, a pyramidal image representation is used which converts a regular narrow-angle image into many images of different scales, with the top of the pyramid representing the scaled-down image and the bottom of the pyramid representing the scaled-up version of the image. The set of differently scaled images are then used to find the potential image matches from the set of rectilinear images.

4. Pyramidal Global Feature Extraction and Image Matching

After computing the pyramidal structure from the regular image, the method 800, at element 840, converts the images in the structure as well as the rectilinear images computed from the spherical image to a feature space in order to perform image matching. Image matching may be challenging in field environments because of long-term appearance changes. For example, the same place may look different at different hours of the day due to illumination and weather changes, and in different months and seasons due to vegetation changes.

Traditional computer vision applications use local features to capture local geometric, color, and intensity information of local regions of an image. Although local features have been successfully used in many applications, there are many studies that demonstrate that this traditional approach fails to address long-term changes.

To solve this issue, the method 800 uses global features that provide the global information of the image. Global features are more robust to environmental changes. The method 800 implements an illumination-independent global feature descriptor which describes the overall appearance and shape information given an image and is applied to all images in the pyramidal structure, and the results are concatenated into a single vector as the representation of the whole image. After computing this representation, the best match is obtained between the regular image and the rectilinear image from a region of the spherical image, based on Euclidean similarity metric. It is noted that by retaining the scale information in the pyramidal representation, the method knows exactly how much to scale up or down the AR content while displaying it on the spherical image, leading to a better user experience.

IV. Sample Results

The above methods have been demonstrated using commercial hardware. Specifically, spherical-based image registration (i.e. matching) has been demonstrated by matching normal images from a commercially available tablet computer (i.e. an iPad) camera and a spherical image. The result is a warped image that overlays the iPad images on top of the projected spherical image. Similarly, matching of two spherical images for self-localization (e.g., determining the orientation of the AR device) was demonstrated. Correspondence of key points (e.g., corners in the images) within the two images are matched to calculate the orientation difference between the spherical images.

V. Other System Features and Embodiments

1. Weighted Matching in Spherical-Based Image Registration

Although local features have been used for image-to-image correspondence in prior work to perform image registration, the efforts are traditionally based on local features that typically have a low robustness to long-term environment changes.

To further improve the matching performance, especially in field environments with long-term changes, the disclosed method may adopt a weighted matching approach that defines weights of global features in various environment scenarios to perform spherical-based image registration. To achieve this, the software uses weights that are defined to indicate the importance of global features based on prior knowledge. The method assigns a high importance to representative features from informative regions and assigns zero weights to features that are not helpful and thus may be removed. Then, the registration is performed using the representative features that also considers importance weights.

The weight matching approach may allow image robustness within a field environment during different climates or conditions. For example, one may localize images with great accuracy at noon or during evening by distinctly assigning importance to the global features of the field environment that are reliably stable in various conditions, such as time of the day obtained from the system.

As a result, the AR and VR views of the larger system may persist in different conditions.

2. Data Collection Given Accurate AR Contextual Overlay

New data related to the field environment may be collected using the computer device by the user with the assistance of the augmented reality overlays on the screen at calculated screen locations to indicate contextual information to facilitate such data collection task. Matching of the regular image from the onboard camera and the spherical image ensures accurate rendering of the augmented reality contextual overlays. The method associates the newly collected data with the spherical images for offsite virtual reality data viewing.

3. Other Embodiments and/or Applications

In one embodiment, the remote server is a cloud-based server. In one embodiment, the remote server is located onsite at or near the operating environment. In one embodiment, the operating environment is an archaeological environment. In one embodiment, the operating environment comprises a resource landscape, such as an archaeological resource landscape.

The exemplary systems and methods of this disclosure have been described in relation to systems and methods involving image registration and self-localization for onsite and offsite viewing. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of determining spherical image based self-localization comprising:
providing a device comprising a device camera, a device communications module, a device processor, a device display, and a device orientation sensor, the device camera configured to collect device camera images, the device communications module configured to interact with the device processor;
positioning a spherical camera within an operating environment, the spherical camera having a spherical camera field of view and a spherical camera communications module, the spherical camera configured to collect spherical camera images, the spherical camera communications module configured to interact with the device processor;
displaying at least one fiduciary marker on the device display;
positioning the device display within the spherical camera field of view;
collecting the device camera images;
collecting the spherical camera images comprising the at least one fiduciary marker on the device display;
transmitting the spherical camera image data to the device communications module;
determining a transformation of the device display with respect to the spherical camera using at least the spherical camera images; and
determining an absolute device state using the transformation; wherein:
the absolute device state comprises absolute device orientation and absolute device position; and
spherical image based self-localization of the device is determined.

2. The method of claim 1, further comprising a step of receiving GNSS-measured device state data used in the determining the transformation of the device display, the GNSS-measured device state data comprising device orientation and device position.

3. The method of claim 2, further comprising a step of receiving device orientation measurements from the device orientation sensor, the device orientation measurements used in the determining the transformation of the device display.

4. The method of claim 1, wherein the spherical camera further comprises a spherical camera communications module that transmits the spherical camera image data to the device communications module.

5. The method of claim 1, further comprising a step of performing fiduciary recognition with respect to the spherical camera images.

6. The method of claim 5, further comprising a step of performing estimation of a pose of the at least one fiduciary marker with respect to the spherical camera images.

7. The method of claim 6, wherein the at least one fiduciary marker comprises a synthetic rectangular marker of a wide black border and an inner binary matrix that contains encoded information.

8. The method of claim 1, further comprising a step of rendering a contextual data overlay on the device display in an augmented reality view.

9. The method of method of claim 1, further comprising a step of rendering a contextual data overlay on the device display in a virtual reality view.

10. The method of claim 1, wherein the determining a transformation of the device display step is associated with a weighted matching approach.

11. A system for determining spherical image based self-localization of an electronic device, the system comprising:
an electronic device comprising a device camera, a device communications module, a device processor, a device display, and a device orientation sensor, the device camera configured to capture device camera images, the device communications module configured to interact with the device processor; and
a spherical camera operating with a spherical camera field of view and having a spherical camera communications module, the spherical camera configured to capture spherical camera images, the spherical camera communications module configured to interact with the device processor; wherein:
at least one fiduciary marker is displayed on the device display;
the device display is positioned within the spherical camera field of view;
the device camera captures the device camera images of an environment;
the spherical camera captures the spherical camera images comprising the at least one fiduciary marker on the device display;
the spherical camera communications module transmits the spherical camera images to the device communications module;
the device processor determines a transformation of the device display with respect to the spherical camera using at least the spherical camera images, and determines an absolute device state using the transformation, the absolute device state comprising an absolute device orientation and an absolute device position; and
a spherical image based self-localization of the device is determined.

12. The system of claim 11, wherein the absolute device orientation is a set of three device angular orientations of roll, pitch, and yaw, and the absolute device position is a set of three device positions of latitude, longitude and elevation.

13. The system of claim 11, wherein the device is a portable electronic device.

14. The system of claim 11, wherein the spherical camera is an omnidirectional spherical camera.

15. The system of claim 11, wherein the device processor further performs fiduciary recognition with respect to the spherical camera images and further performs estimation of a pose of the at least one fiduciary marker with respect to the spherical camera images.

16. The system of claim 11, wherein the device communications module receives GNSS-measured device state data used in determining the transformation of the device display, the GNSS-measured device state data comprising device orientation and device position.

17. The system of claim 16, wherein the device communications module receives device orientation measurements from the device orientation sensor, the device orientation measurements used in determining the transformation of the device display.

18. The system of claim 17, wherein the device display is configured to render a contextual data overlay on the device display in at least one of an augmented reality view and a virtual reality view.

19. The system of claim 11, wherein the at least one fiduciary marker comprises an inner binary matrix that contains encoded information.

20. A method of determining spherical image based self-localization of an electronic device, the method comprising:

providing an electronic device comprising a device camera, a device communications module, a device processor, a device display, and a device orientation sensor, the device camera configured to collect device camera images, the device communications module configured to interact with the device processor;

positioning a spherical camera within an operating environment, the spherical camera having a spherical camera field of view and a spherical camera communications module, the spherical camera configured to collect spherical camera images, the spherical camera communications module configured to interact with the device processor;

displaying at least one fiduciary marker on the device display, the at least one fiduciary marker a synthetic rectangular marker of a wide black border and an inner binary matrix that contains encoded information;

positioning the device display within the spherical camera field of view;

collecting the device camera images;

collecting the spherical camera images comprising the at least one fiduciary marker on the device display;

transmitting the spherical camera image data from the spherical camera communication module to the device communications module;

receiving GNSS-measured device state data comprising device orientation and device position;

receiving device sensor orientation data from the device orientation sensor;

performing fiduciary recognition with respect to the spherical camera images;

performing estimation of a pose of the at least one fiduciary marker with respect to the spherical camera images;

determining a transformation of the device display with respect to the spherical camera using at least the spherical camera images, the GNSS-measured device state data, and the device sensor orientation data; and determining an absolute device state using the transformation; wherein:

the absolute device state comprises absolute device orientation and absolute device position; and spherical image based self-localization of the electronic device is determined.

* * * * *